(No Model.)
N. T. WILCOX.
ELECTRIC CURRENT TRANSFORMER.
No. 477,879.                                        Patented June 28, 1892.
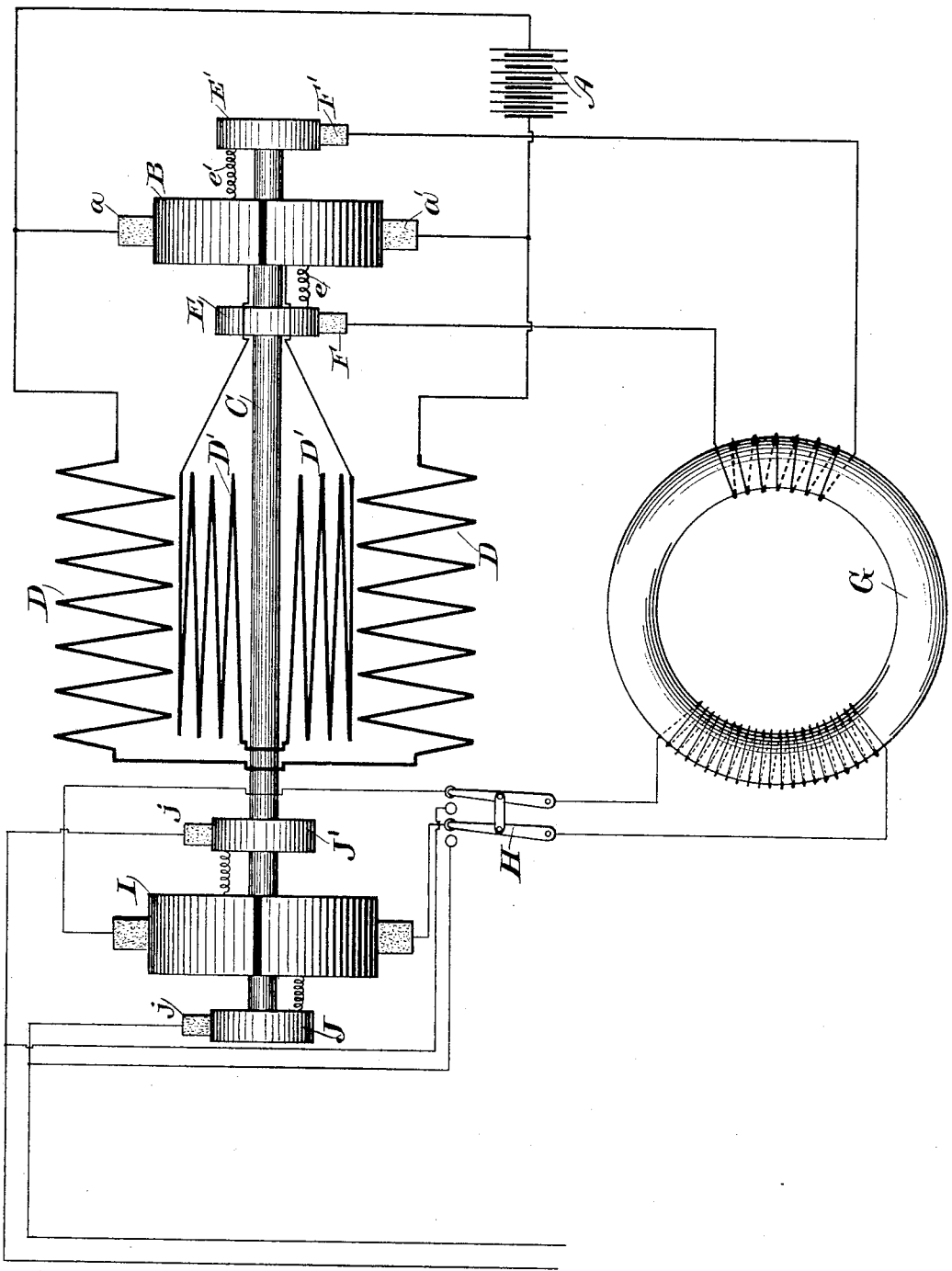
WITNESSES:                                          INVENTOR:

UNITED STATES PATENT OFFICE.

NORMAN T. WILCOX, OF MERIDEN, CONNECTICUT.

ELECTRIC-CURRENT TRANSFORMER.

SPECIFICATION forming part of Letters Patent No. 477,879, dated June 28, 1892.

Application filed August 20, 1891. Serial No. 403,253. (No model.)

*To all whom it may concern:*

Be it known that I, NORMAN T. WILCOX, a citizen of the United States, residing at Meriden, in the county of New Haven and State of Connecticut, have invented certain new and useful Improvements in Electric-Current Transformers, of which the following is a specification.

The object of my invention is to provide an improved apparatus whereby a source of direct current of comparatively low tension may be converted into a current of higher tension and less volume, and when thus converted utilized either as a direct or alternating current, as may be desired.

The apparatus hereinafter described comprises an electric motor and what I term a "current-alternator" driven by the motor for converting such portion of the electrical energy as is not employed in driving the motor itself into an alternating current, which by a transformer is transformed into a similar current of less volume, but greater tension, which may be used in that form, or by simply throwing a switch the secondary current may be passed through a current-rectifier patterned after the alternator, and thus a direct current be obtained for final use.

My invention has been designed particularly for use in therapeutical apparatus which must be capable of easy transportation and requires a battery of no great size, the current of which may be transformed, as indicated above, so as to possess any desired tension.

In the accompanying drawing, which illustrates my invention diagrammatically, A represents an electric generator, which will ordinarily be a storage or primary battery. The poles of the generator are connected to the segments of a two-part commutator B by brushes *a a'*, the segments of course being insulated from one another when connected up in circuit of opposite polarity. This commutator is mounted on the armature-shaft C of an ordinary shunt-wound electric motor, whose field-coil and armature-winding are represented at D D', respectively. Upon the armature-shaft are also mounted two conducting collecting-rings E E', which are connected, as seen at *e e'*, each with one of the segments of commutator B. These rings, therefore, will be of opposite polarity, and when the motor is in operation their polarity will be constantly and rapidly reversed. Bearing on the rings are two brushes F F', which complete the primary circuit of the transformer G. The transformer is so wound that the current generated in the secondary circuit will be of higher voltage, but less amperage, and will of course be alternating in character. The two ends of the secondary coil are connected to a double-pole switch H, which when placed on one set of contacts (shown at the left in the drawing) lead directly to line; but when, as is usually the case in therapeutical apparatus, a direct current is desired the switch is thrown onto a second set of contacts, as represented in the drawing, and the current passes to a second two-part commutator I, whose segments are connected to a set of conducting-rings J J' on the armature-shaft or otherwise driven by the electric motor, the connections being made in the same way as has already been described. These rings are in turn kept in conducting connection with the service-lines by brushes *j j*, and the current taken off by these brushes will be direct in character.

The electric motor is herein represented as shunt-wound; but the particular construction of the motor is not essential, though that illustrated is preferred, and though the invention has been designed particularly, as I have already stated, to provide a convenient form of therapeutical apparatus, still it is not my intention to have the claims necessarily limited to such apparatus alone, as the principles herein explained may well be put to use in other connections.

It has been customary heretofore to convert a direct into an alternating current, which is then transformed and reconverted back to a direct current; but the apparatus which I have described for effecting these results is much simpler and more inexpensive than any heretofore known to me, for instead of using a number of commutators, each of which is expensive and liable to spark and otherwise give trouble, I have only a single commutator, whose segments are connected, as shown, to plain conducting-rings, and thereby, as it were, the transformer is kept directly in circuit with the segments of the commutator, which commute the current supplied to the electric motor.

What I claim as new, and desire to secure by Letters Patent, is—

1. The combination of a direct-current generator, a direct-current motor, a transformer, and collecting-rings to which one of the windings of the transformer is connected, with a single commutator having opposite segments connected to the collecting-rings and serving also to commute the current flowing through one part of the motor, as described.

2. The combination of an electric motor with its commutator B, having segments of opposite polarity connected, respectively, to collecting-rings, brushes bearing on said rings, a transformer having its primary in circuit with the current taken off by said brushes, and a current-rectifier for rectifying the current generated in the secondary of the transformer, as set forth.

3. The combination, with a direct-current electric motor and its commutator, of collecting-rings in circuit with segments of the commutator of relatively-opposite polarity, a transformer adapted to transform from low to high tension, having its primary in circuit with the rings, and a second commutator and set of rings likewise driven by the motor and in circuit with the secondary winding of the transformer and reconverting the alternating current into a direct current, as set forth.

In witness whereof I have hereunto set my hand this 12th day of August, 1891.

NORMAN T. WILCOX.

Witnesses:
G. R. BLODGETT,
A. O. ORNE.